United States Patent [19]

Starkweather, Jr. et al.

[11] 4,078,014
[45] Mar. 7, 1978

[54] COMPOSITION OF POLYAMIDE, POLYETHYLENE IONOMER COPOLYMER

[75] Inventors: Howard Warner Starkweather, Jr., Wilmington; Michael Joseph Mutz, Newark, both of Del.

[73] Assignee: E. I. Du Pont de Nemours and Company, Wilmington, Del.

[21] Appl. No.: 694,646

[22] Filed: Jun. 10, 1976

[51] Int. Cl.$^2$ ............................................. C08L 77/00
[52] U.S. Cl. .................................................. 260/857 L
[58] Field of Search ..................................... 260/857 L

[56] References Cited

U.S. PATENT DOCUMENTS

| | | | |
|---|---|---|---|
| 3,264,272 | 8/1966 | Rees | 526/13 |
| 3,373,223 | 3/1968 | Armstrong | 260/857 L |
| 3,373,224 | 3/1968 | Mesrobian | 260/857 L |
| 3,492,367 | 1/1970 | Starkweather | 260/857 L |
| 3,833,708 | 9/1974 | Miller | 260/857 L |
| 3,845,163 | 10/1974 | Murch | 260/857 L |
| 3,963,799 | 6/1976 | Starkweather | 260/857 L |

*Primary Examiner*—Paul Lieberman

[57] ABSTRACT

A composition consisting essentially of 65 to 89% by weight of crystallizable polyamide, 10 to 30% by weight polyethylene, and 1 to 20% by weight of a copolymer comprising polymerized units of ethylene and at least one $\alpha,\beta$-ethylenically unsaturated carboxylic acid having from 3 to 8 carbon atoms, the copolymer having from 15 to 80% of carboxylic acid groups ionized by neutralization with metal ions of zinc, cadmium or lead. The composition possesses good tensile properties including toughness and is useful for moldings and insulated wire jacketing.

9 Claims, No Drawings

COMPOSITION OF POLYAMIDE, POLYETHYLENE IONOMER COPOLYMER

BACKGROUND OF THE INVENTION

1. Field of the Invention

This invention relates to a composition of polyamide, polyethylene and an ionic copolymer.

2. Description of the Prior Art

The blending of polyamide (nylon) with polyolefin is known. These two materials are regarded as incompatible due to their difference in structure, crystallinity and chemical component groups. One way to achieve compatibility in a blend of polyamide and polyolefin is to add an additional component. Several patents are concerned with improvement of the compatibility of polyamide-polyolefin blends.

U.S. Pat. Nos. 3,373,222; 3,373,224 and 3,873,667 disclose blends of polyamide, polyolefins such as polyethylene and a third component which enables the first two components to be compatible. In U.S. Pat. No. 3,373,222 the third component is a carboxylated linear polyethylene having an acid number of 2.75 to 50. The third component of U.S. Pat. No. 3,373,224 is an ionic copolymer partially neutralized by sodium ions. U.S. Pat. No. 3,873,667 discloses as a compatibilizing material an ionic copolymer partially neutralized by metal ions. The three patents relate to compositions which possess resistance to the permeation of fluids and gases. In these patents it is necessary to obtain these physical properties by controlling the amount or ratio of polyamide and polyolefin present in the blend. These patents do not disclose a composition in which the polyamide content is as great as 60 percent by weight or a polyolefin content less than 40 percent by weight.

Another prior art teaching, U.S. Pat. No. 3,845,163 discloses a two-component blend of polyamide in an amount of 50 to 99 percent by weight, with the remainder being an acid-containing olefin polymer in which the acid is an $\alpha,\beta$-ethylenically unsaturated carboxylic acid in which at least 10 percent of acid groups have been neutralized with metal ions. The blend provides higher toughness, particularly weld-line toughness, in molded articles in comparision to a blend of polyamide and an acid containing olefin copolymer (which does not contain metal ions).

U.S. Ser. No. 523,467, and now U.S. Pat. No. 3,963,799, relates to polymer blends of polyamide and polyethylene, the former in a predominant amount. A minor amount of graft copolymer is present in the blend, the graft copolymer consisting essentially of a trunk copolymer derived from ethylene and a comonomer providing amine-reactive sites, and polycaprolactam side chains having an average degree of polymerization of about 5 to 30 linked to the reactive sites through amide. The graft copolymer materially aids in permitting a fine grain dispersion of the polyethylene component in the polyamide.

SUMMARY OF THE INVENTION

In accordance with this invention a composition is provided which consists essentially of 65 to 89 percent by weight of crystallizable polyamide, 10 to 30 percent by weight of polyethylene, and 1 to 20 percent by weight of a copolymer comprising polymerized units of ethylene and at least one $\alpha,\beta$-ethylenically unsaturated carboxylic acid having from 3 to 8 carbon atoms, the copolymer having from 15 to 80 percent of carboxylic acid groups ionized by neutralization with metal ions taken from the class consisting of zinc, cadmium and lead.

DETAILED DESCRIPTION OF THE INVENTION

The composition which is predominantly polyamide consists essentially of three components:

(1) crystallizable polyamide, 65 to 89 percent by weight;

(2) polyethylene, 10 to 30 percent by weight; and (3) ionic copolymer, (15 to 80 percent neutralized with metal ions of zinc, cadmium and lead), 1 to 20 percent by weight.

The polyamide present in the blend embraces crystallizable polyamides having a molecular weight of at least 12,000, commonly referred to as nylons. Polyamides well known in the prior art can be employed and can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include hexamethylene adipamide (66 nylon), polyhexamethylene azelaamide (69 nylon), polyhexamethylene sebacamide (610 nylon), and polyhexamethylene dodecanoamide (612 nylon), polycaprolactam, polylauric lactam, poly-11-amino-undecanoic acid, bis(paraaminocyclohexyl) methane dodecanoamide. A nylon (66) which is a reprocessed polyamide textile fiber is also useful (referred to herein as 66-PF). It is also possible in this invention to use polyamide prepared by the copolymerization of two of the above polymers or terpolymerization of the above polymers or their components, e.g., an adipic, isophthalic acid hexamethylene diamine copolymer. Preferably the polyamide is linear with a melting point in excess of 200° C. The polyamide component is present in the blend in an amount of 65 to 89 percent by weight; however, preferred blends contain 70 to 80 percent by weight.

The polyethylene used in the composition includes those commercially available and both low and high density polyethylenes (LDPE and HDPE) are suitable. Preferably, a high density polyethylene is employed, e.g. one with a density at least 0.95. The polyethylene in the three component blend of the present invention is present in an amount of 10 to 30 percent by weight; preferably the weight ratio of polyethylene to a third component of the blend, i.e., an ionic copolymer, is not greater than 7 to 1. In the composition the polyethylene has been observed to be present in domains with the majority of such domains having a diameter not greater than one micron.

The third component of the composition comprises an ionic copolymer containing polymerized units of ethylene and at least one $\alpha,\beta$-ethylenically unsaturated carboxylic acid. At least 15 percent and not more than 80 percent of carboxylic acid groups are ionized by neutralization with metal ions selected from the class consisting of zinc, cadmium and lead ions. A preferred range of neutralization is from 45 to 65 percent of the carboxylic acid groups. A preferred metal ion is zinc ion.

The ionic copolymer is present in the composition in an amount of 1 to 20 percent by weight, preferably 2 to 5% by weight. As previously mentioned, this component is preferably present in a ratio not greater than 7 to 1 based on the weight ratio of polyethylene to ionic copolymer.

Suitable ionic copolymers are copolymers comprising polymerized units of ethylene and at least one $\alpha,\beta$-ethylenically unsaturated carboxylic acid having from 3 to 8 carbon atoms (and, optionally, a monoethylenically unsaturated monomer). The concentration of ethylene polymerized units is greater than 80 mol percent; an upper limit is 99 mol percent. Examples of $\alpha,\beta$-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because its chemical reactivity is that of an acid. Similarly, other $\alpha,\beta$-monoethylenically unsaturated anhydrides of carboxylic acids can be employed. Also diacids are suitable. Preferred acids are methacrylic and acrylic acids.

In the composition of the present invention it is believed that the ionomer reacts with amine end groups on polyamide molecules to form a graft copolymer which can provide bonding between the polyamide and polyethylene regions by virtue of the ability of its segments, trunk and branches, to cocrystallize with polyethylene and polyamide, respectively. For this reason, it is necessary that the fraction of ethylene units in the ionomer be quite high, i.e. at least 80 mol percent. This does not rule out ionomers formed from a third unsaturated monomer, such as vinyl acetate or methyl acrylate. However, an ionomer derived solely from ethylene and an $\alpha,\beta$-unsaturated carboxylic acids is preferred.

In accordance with the preceding paragraph, an additional monoethylenically unsaturated monomer can be used to form the ionic copolymer. The introduction of this monomer should not eliminate polyethylene crystallinity (determined by X-ray diffraction).

The ionic copolymers can be prepared as described in U.S. Pat. Nos. 3,264,272 and 3,437,718. It is preferred that the product of the degree of neutralization and the weight fraction of unsaturated acid, e.g., methacrylic acid, in the base copolymer be at least 4 percent by weight.

The presence of the ionic copolymer in the polyamide and polyethylene composition not only promotes dispersion of the polyethylene in the polyamide but also increases the stability of such a dispersion. Compositions which do not contain the ionic copolymer are poorer in at least one of the following properties: strength, toughness or elongation.

The presence of the zinc, cadmium or lead ionic copolymer increases interfacial adhesion between the polyamide and polyethylene. A test for determining interfacial adhesion is by cooling a composition in liquid nitrogen followed by fracturing. Examination of a fracture surface determines if phase separation has occurred. This test for interfacial adhesion shows use of an ionic copolymer of sodium does not prevent phase separation of the polyamide and polyethylene regions.

The blends of the present invention have good tensile properties including strength, toughness and elongation. The combination of good tensile properties is present even though 65 to 80 percent by weight of the blend is formed from a polyamide which can have poor physical properties (particularly in toughness and elongation). Nylon fibers (66-PF) with poor tensile properties are particularly suitable for the polyamide component in the composition.

Various additives can be present in the compositions of this invention. These additives include pigments (e.g., titanium dioxide or carbon black), fillers (e.g., glass particles or graphite) and reinforcing agents (e.g., fibrous materials such as asbestos or glass fibers). Therefore, it is understood the percentage figures of polyamide, polyethylene and ionic copolymer given herein are based on these three components.

The composition of the present invention is useful for molded parts and components. The composition is also useful as jacketing over insulated wire.

EXAMPLES OF THE INVENTION

The following Examples illustrate the invention.

Flexural modulus was measured in psi by standard ASTM D-790-71. Samples were injection molded using a cylinder temperature of 280° C. and a mold temperature of 50° C. to form bars 5 inch by 0.5 inch by 0.125 inch. The bars were conditioned at room temperature 16 to 24 hours before testing. The test was conducted using a 2 inch span at a crosshead speed of 0.05 inch/minute. The tangent modulus of elasticity (flexural modulus) was calculated using the equation given in the ASTM procedure. Tensile strength at yield in psi (Yield Point), ultimate tensile strength in psi (Ultimate Strength) and percent elongation at break (Elongation) were measured by the standard ASTM D-638-72 test.

The Izod Impact Strength test (Izod) was determined by standard ASTM D-256-73 on injection molded bars with machined notches. Samples were allowed to condition at room temperature for 16 to 24 hours, after cutting and notching, before testing. Five bars of each sample were tested and the average value reported as the Izod Impact Strength in ft. lbs./inch of notch.

In the Examples and Controls the following materials were used:
Polyamide (nylon)
Polyhexamethylene adipamide (66)
Polyhexamethylene dodecanoamide (612)
Polyhexamethylene adipamide, processed fiber (66-PF)

POLYETHYLENE

High density resin (density 0.95, melt index 4.5)

IONIC COPOLYMER

Copolymer of ethylene with a given percentage of methacrylic acid neutralized with metal ions

| Code | Melt Index | Ion | % Neutralization | Melt Index Base Resin | % Methacyclic Acid |
| --- | --- | --- | --- | --- | --- |
| A | 1.6 | Zn | 38 | 13.5 | 12 |
| B | 0.6 | Zn | 65 | 10 | 9 |
| C | 4.4 | Zn | 18 | 10 | 9 |
| D | 0.7 | Zn | 58 | 60 | 15 |
| E | 1.1 | Zn | 71 | 35 | 10 |
| F | 1.0 | Zn | 46 | 13.5 | 12 |
| G | | Cd | 50 | 100 | 11 |
| H | | Pb | 50 | 100 | 11 |
| I | | Zn | 50 | 100 | 11 |
| J | | Na | 35 | 100 | 11 |

EXAMPLES 1 TO 47

Pellets of polyamide (nylon), an ethylene polymer and an ionic copolymer were mixed and fed to a twin screw extruder for melt blending. The resulting compositions were injection molded at 280° C. and subjected to the tests indicated in Table I. In specific examples the sample was cooled in liquid nitrogen, fractured and examined in its fractured surface by means of a scanning electron microscope.

TABLE I

| Example | 1 | 2 | 3 | 4 | 5 | 6 | 7 | 8 |
|---|---|---|---|---|---|---|---|---|
| Polyamide (weight %) | 66(73.6) | 66(74.3) | 66(72.8) | 66(71.4) | 66(75) | 66(75) | 66(75) | 66(85) |
| Polyethylene (weight %) | 24.5 | 24.7 | 24.3 | 23.8 | 21 | 17 | 13 | 10 |
| Ionic Copolymer (weight %) | A(1.9) | A(1.0) | A(2.9) | A(4.8) | A(4) | A(8) | A(12) | A(5) |
| Tensile Properties of Dry Moldings | | | | | | | | |
| Yield Point, p.s.i. | 8320 | 8988 | 9038 | 8864 | 8554 | 8296 | 8938 | 9690 |
| Ultimate Strength, p.s.i. | 6528 | 6769 | 6807 | 6903 | 6919 | 7346 | 8266 | 7470 |
| Elongation at Break, % | 91 | 54 | 97 | 146 | 156 | 269 | 388 | 129 |
| Notched Izod, Ft.Lb./in. | 0.93 | 1.05 | 1.17 | 1.68 | 1.14 | 1.35 | 1.53 | 1.43 |
| Flexural Modulus (Dry), psi, × 1000 | — | — | — | 318 | — | — | 289 | — |
| Scanning Electron Microscopy | | | | | | | | |
| Diameter of Polyethylene domains, μ | 0.2–1.0 | | | .2–.6 | | | .1–.5 | |
| Interphase Adhesion | Good | | | Good | | | Good | |

| Example | 9 | 10 | 11 | 12 | 13 | 14 | 15 | 16 |
|---|---|---|---|---|---|---|---|---|
| Polyamide (weight %) | 66(80) | 66(75) | 66(65) | 66(70) | 66(70) | 66(70) | 66(70) | 66(65) |
| Polyethylene (weight %) | 15 | 20 | 30 | 25 | 20 | 15 | 10 | 25 |
| Ionic Copolymer (weight %) | A(5) | A(5) | A(5) | A(5) | A(10) | A(15) | A(20) | A(10) |
| Tensile Properties of Dry Moldings | | | | | | | | |
| Yield Point, p.s.i. | 8985 | 8845 | 8055 | 7895 | 7810 | 7380 | 7230 | 7275 |
| Ultimate Strength, p.s.i. | 7130 | 7120 | 6455 | 6295 | 6495 | 8015 | 8555 | 6190 |
| Elongation at Break, % | 205 | 132 | 101 | 43 | 190 | 385 | 395 | 160 |
| Notched Izod, Ft.Lb./in. | 1.41 | 1.24 | 1.31 | 1.05 | 1.36 | 1.50 | 1.73 | 1.27 |
| Flexural Modulus (Dry), psi, × 1000 | 323 | — | — | 271 | 268 | 249 | 245 | 254 |
| Scanning Electron Microscopy | | | | | | | | |
| Diameter of Polyethylene domains, μ | .2–1.0 | | | | | | | |
| Interphase Adhesion | Good | | | | | | | |

| Example | 17 | 18 | 19 | 20 | 21 | 22 | 23 | 24 |
|---|---|---|---|---|---|---|---|---|
| Polyamide (weight %) | 66(65) | 66(75) | 66(88) | 66(83) | 66(78) | 66(68) | 66-PF (71.4) | 66PF(70) |
| Polyethylene (weight %) | 20 | 10 | 10 | 15 | 20 | 30 | 23.8 | 15 |
| Ionic Copolymer (weight %) | A(15) | A(15) | A(2) | A(2) | A(2) | A(2) | A(4.8) | A(15) |
| Tensile Properties of Dry Moldings | | | | | | | | |
| Yield Point, p.s.i. | 6840 | 7885 | 9545 | 9115 | 8380 | 8050 | 8405 | 7465 |
| Ultimate Strength, p.s.i. | 7585 | 7100 | 7540 | 7100 | 6605 | 6315 | 6735 | 6425 |
| Elongation at Break, % | 363 | 251 | 120 | 86 | 61 | 59 | 45 | 146 |
| Notched Izod, Ft.Lb./in. | 1.51 | 1.54 | 1.43 | 1.19 | 1.02 | 1.07 | 1.05 | 1.69 |
| Flexural Modulus (Dry) p.s.i, × 1000 | 236 | 272 | 346 | 335 | 301 | 272 | — | 255 |
| Scanning Electron Microscopy | | | | | | | | |
| Diameter of Polyethylene domains, μ | | | .2–1.0 | | | | | |
| Interphase Adhesion | | | Good | | | | | |

| Example | 25 | 26 | 27 | 28 | | | | |
|---|---|---|---|---|---|---|---|---|
| Polyamide (weight %) | 66-PF (70) | 66-PF (70) | 66-PF(65) | 66PF (65) | | | | |
| Polyethylene (weight %) | 20 | 25 | 25 | 30 | | | | |
| Ionic Copolymer (weight %) | A(10) | A(5) | A(10) | A(5) | | | | |
| Tensile Properties of Dry Moldings | | | | | | | | |
| Yield Point, p.s.i. | 7820 | 8065 | 7165 | 7575 | | | | |
| Ultimate Strength, p.s.i. | 6200 | 6140 | 5800 | 6015 | | | | |
| Elongaton at Break, % | 100 | 68 | 81 | 98 | | | | |
| Notched Izod, Ft.Lb./in. | 1.31 | 1.06 | 1.31 | 1.09 | | | | |
| Flexural Modulus (Dry), psi, × 1000 | 269 | 278 | 249 | 254 | | | | |
| Scanning Electron Microscopy | | | | | | | | |
| Diameter of Polyethylene domains, μ | | | | | | | | |
| Interphase Adhesion | | | | | | | | |

| Example | 29 | 30 | 31 | 32 | 33 | 34 | 35 |
|---|---|---|---|---|---|---|---|
| Polyamide (weight %) | 612(85) | 612(80) | 612(75) | 612(80) | 66(73.5) | 66(73.5) | 66(73.5) |
| Polyethylene (weight %) | 10 | 15 | 15 | 10 | 24.5 | 24.5 | 24.5 |
| Ionic Copolymer (weight %) | A(5) | A(5) | A(10) | A(10) | B(2) | C(2) | D(2) |
| Tensile Properties of Dry Moldings | | | | | | | |
| Yield Point, p.s.i. | 7815 | 7615 | 7245 | 7195 | 8760 | 8950 | 8730 |
| Ultimate Strength, p.s.i. | 6175 | 8140 | 9250 | 9365 | 6420 | 6500 | 6640 |
| Elongation at Break, % | 270 | 495 | 545 | 590 | 61 | 85 | 82 |
| Notched Izod, Ft.Lb./in. | 0.97 | 1.14 | 1.22 | 1.28 | 1.24 | 1.17 | 1.34 |
| Flexural Modulus (Dry), p.s.i, × 1000 | — | — | — | — | — | — | — |
| Scanning Electron Microscopy | | | | | | | |
| Diameter of Polyethylene domains, μ | | | | | | — | 0.1 |
| Interphase Adhesion | | | | | | | Good |

| Example | 36 | 37 | 38 | 39 | 40 | 41 | 42 | 43 |
|---|---|---|---|---|---|---|---|---|
| Polyamide (weight %) | 66(73.5) | 66(73.5) | 66(71.4) | 66(71.4) | 66(71.4) | 66(71.4) | 66(71.4) | 66(71.4) |
| Polyethylene (weight %) | 24.5 | 24.5 | 23.8 | 23.8 | 23.8 | 23.8 | 23.8 | 23.8 |
| Ionic Copolymer (weight %) | E(2) | F(2) | B(4.8) | C(4.8) | D(4.8) | E(4.8) | F(4.8) | B(4.8) |
| Tensile Properties of Dry Moldings | | | | | | | | |
| Yield Point, p.s.i. | 8860 | 8450 | 8310 | 7940 | 8660 | 8440 | 8060 | 8415 |
| Ultimate Strength, p.s.i. | 6530 | 6440 | 6500 | 6280 | 7530 | 6630 | 6600 | 6380 |
| Elongation at Break, % | 73 | 95 | 249 | 84 | 259 | 106 | 97 | 68 |
| Notched Izod, Ft.Lb./in. | 1.33 | 1.26 | 1.53 | 1.37 | 1.82 | 1.78 | 1.45 | 1.34 |
| Flexural Modulus (Dry), p.s.i, × 1000 | — | — | — | — | — | — | — | — |
| Scanning Electron Microscopy | | | | | | | | |
| Diameter of Polyethylene domains, μ | 0.2–0.3 | — | — | — | 0.4–1.0 | — | — | — |
| Interphase Adhesion | Good | | | | Fair-Good | | | |

| Example | 44 | 45 | 46 | 47 | Control 1 | Control 2 | Control 3 | Control 4 |
|---|---|---|---|---|---|---|---|---|
| Polyamide (weight %) | 66-PF(71.4) | 66-PF(71.4) | 66-PF(71.4) | 66-PF(71.4) | 66(80) | 66(85) | 612(80) | 66PF(60) |
| Polyethylene (weight %) | 23.8 | 23.8 | 23.8 | 23.8 | 20 | 15 | 20 | 30 |
| Ionic Copolymer (weight %) | C(4.8) | D(4.8) | E(4.8) | F(4.7) | 0 | 0 | 0 | A(10) |

TABLE I-continued

| Tensile Properties of Dry Moldings | | | | | | | | |
|---|---|---|---|---|---|---|---|---|
| Yield Point, p.s.i. | 8460 | 8580 | 8760 | 8400 | 8190 | 7560 | 7221 | 6965 |
| Ultimate Strength, p.s.i. | 6280 | 6580 | 6450 | 6300 | 6280 | 5535 | 5364 | 6340 |
| Elongation at Break, % | 58 | 80 | 59 | 74 | 58 | 66 | 99 | 40 |
| Notched Izod, Ft.Lb./in. | 1.15 | 1.39 | 1.21 | 1.33 | 0.56 | 0.84 | 0.79 | 0.99 |
| Flexural Modulus (Dry), p.s.i, × 1000 | — | — | — | — | 358 | 230 | 239 | 222 |
| Scanning Electron Microscopy | | | | | | | | |
| Diameter of Polyethylene domains, $\mu$ | — | — | — | — | 0.5–1.1 | | | |
| Interphase Adhesion | | | | | Poor | | | |

EXAMPLES 48 TO 50

Ionic copolymers of ethylene and methacrylic acid designated G to I using the metal acetates to neutralize the acid were prepared on a roll mill at 200° C. Blends were prepared in a twin-screw extruder at 280° C. from 375 g. of polyamide, 125 g. of polyethylene and 10 g. of ionic copolymer. The resulting blends were injection molded at 280° C. and subjected to the tests indicated in Table II.

TABLE II

| Example | 48 | 49 | 50 |
|---|---|---|---|
| Polyamide (%) | 66(73.6) | 66(73.6) | 66(73.6) |
| Polyethylene (%) | 24.5 | 24.5 | 24.5 |
| Ionic Copolymer (%) | G(1.9) | H(1.9) | I(1.9) |
| Tensile Properties of Dry Moldings | | | |
| Yield Point, p.s.i. | 8640 | 8715 | 8520 |
| Ultimate Strength, p.s.i. | 6785 | 6805 | 6695 |
| Elongation at Break, % | 55 | 50 | 80 |
| Notched Izod, ft. lb./in. | 0.93 | 0.93 | 1.13 |
| Interface Adhesion | Good | Good | Good |

CONTROLS 5 TO 7

The procedure described in Examples 48 to 50 was repeated with the test results indicated in Table III.

TABLE III

| Control | 5 | 6 | 7 |
|---|---|---|---|
| Polyamide (%) | 66(73.6) | 66(75) | 66(71.4) |
| Polyethylene (%) | 24.5 | 20 | 23.8 |
| Ionic Copolymer (%) | J(1.9) | J(5.0) | J(4.8) |
| Tensile Properties of Dry Moldings | | | |
| Yield Stress, p.s.i. | 8580 | 8725 | 8470 |

TABLE III-continued

| Ultimate Strength, p.s.i. | 6870 | 7440 | 7315 |
|---|---|---|---|
| Elongation at Break, % | 80 | 31 | 34 |
| Notched Izod, ft. lb./in. | 0.80 | 0.91 | 0.93 |
| Interface Adhesion | Poor | Poor | Poor |

What is claimed is:

1. A composition which consists essentially of 65 to 89% by weight of crystallizable polyamide, 10 to 30% by weight of polyethylene, and 1 to 20% by weight of a copolymer comprising polymerized units of ethylene and at least one $\alpha,\beta$-ethylenically unsaturated carboxylic acid having from 3 to 8 carbon atoms, the copolymer having from 15 to 80% of carboxylic acid groups ionized by neutralization with metal ions selected from the class consisting of zinc, cadmium and lead ions.

2. The composition of claim 1 wherein 70 to 80% by weight of polyamide is present.

3. The composition of claim 1 wherein the polyethylene has a density of at least 0.95.

4. The composition of claim 1 wherein the metal ion is zinc.

5. The composition of claim 4 wherein a range of neutralization is from 45 to 65%.

6. The composition of claim 1 wherein the polyethylene is present in domains, the majority of which have diameters no greater than 1 micron.

7. The composition of claim 1 wherein 2 to 5 percent by weight of the copolymer is present.

8. The composition of claim 2 wherein the weight ratio of polyethylene to ionic copolymer is not greater than 7 to 1.

9. The composition of claim 1 wherein the copolymer comprises at least 80 mol percent ethylene polymerized units.

* * * * *